(12) United States Patent
Burch et al.

(10) Patent No.: US 12,461,259 B2
(45) Date of Patent: Nov. 4, 2025

(54) DIRECT FILL CHAMBER

(71) Applicant: TGS-NOPEC Geophysical Company, Houston, TX (US)

(72) Inventors: Darrell Burch, Houston, TX (US); Emerson Jose Verissimo, Houston, TX (US); Timothy Dudley, Houston, TX (US)

(73) Assignee: TGS-NOPEC Geophysical Company, Houston, TX (US)

( * ) Notice: Subject to any disclaimer, the term of this patent is extended or adjusted under 35 U.S.C. 154(b) by 554 days.

(21) Appl. No.: 17/384,325

(22) Filed: Jul. 23, 2021

(65) Prior Publication Data

US 2022/0043173 A1    Feb. 10, 2022

Related U.S. Application Data

(60) Provisional application No. 63/063,053, filed on Aug. 7, 2020.

(51) Int. Cl.
*G01V 1/133* (2006.01)
*G01V 1/04* (2006.01)
*G01V 1/137* (2006.01)

(52) U.S. Cl.
CPC .............. *G01V 1/133* (2013.01); *G01V 1/04* (2013.01); *G01V 1/137* (2013.01)

(58) Field of Classification Search
CPC ........... G01V 1/137; G01V 1/04; G01V 1/133
USPC .................................................. 181/119, 120
See application file for complete search history.

(56) References Cited

U.S. PATENT DOCUMENTS

| 3,349,367 | A | | 10/1967 | Wisotsky |
| 3,805,914 | A | | 4/1974 | Havlik et al. |
| 4,381,044 | A | * | 4/1983 | Kirby ............... G01V 1/137 |
| | | | | 181/118 |
| 4,556,120 | A | * | 12/1985 | Kirby ............... G01V 1/137 |
| | | | | 181/118 |

(Continued)

FOREIGN PATENT DOCUMENTS

| EP | 0393261 | A1 | | 10/1990 |
| GB | 2085163 | A | | 4/1982 |
| RU | 2085163 | C1 | * | 7/1997 |

OTHER PUBLICATIONS

Krail, Paul M., "Airguns: Theory and operation of the marine seismic source," University of Texas at Austin Texas Schlar Works, 2010 [Abstract Only].

(Continued)

*Primary Examiner* — Forrest M Phillips
*Assistant Examiner* — Joseph James Peter Illicete
(74) *Attorney, Agent, or Firm* — Sage Patent Group

(57) ABSTRACT

Embodiments herein describe a seismic source that includes a reservoir configured to hold compressed gas, a first firing head coupled to the reservoir where the first firing head configured to generate seismic energy by releasing a first portion of the compressed air from the reservoir to form a first gas bubble in a seismic medium, and a second firing head coupled to the reservoir where the second firing head configured to generate seismic energy by releasing a second portion of the compressed gas from the reservoir to form a second gas bubble in the seismic medium. Moreover, at least one first fill line is coupled directly to the reservoir.

13 Claims, 10 Drawing Sheets

(56) References Cited

U.S. PATENT DOCUMENTS

| | | | | |
|---|---|---|---|---|
| 4,648,479 | A | * | 3/1987 | Dolengowski ......... G01V 1/137 181/402 |
| 4,715,023 | A | * | 12/1987 | Otto ....................... G01V 1/006 367/154 |
| 4,858,205 | A | | 8/1989 | Harrison |
| 4,921,068 | A | * | 5/1990 | Pascouet ................ G01V 1/387 181/115 |
| 4,949,315 | A | * | 8/1990 | Pascouet ................ G01V 1/387 181/115 |
| 5,185,726 | A | | 2/1993 | Curto et al. |
| 6,539,308 | B2 | | 3/2003 | Monk et al. |
| 6,873,571 | B2 | * | 3/2005 | Clayton ................ G01V 1/006 367/144 |
| 8,570,835 | B2 | * | 10/2013 | Chelminski ............ G01V 1/135 367/172 |
| 9,025,417 | B2 | | 5/2015 | Hopperstad et al. |
| 9,360,578 | B2 | | 6/2016 | Hopperstad et al. |
| 9,395,461 | B2 | * | 7/2016 | Hovland ................ B63B 21/66 |
| 9,804,280 | B2 | * | 10/2017 | Chelminski ............ G01V 13/00 |
| 10,401,511 | B2 | * | 9/2019 | Morozov ................ G01V 1/133 |
| 11,635,536 | B2 | * | 4/2023 | Chelminski ............ G01V 1/137 367/144 |
| 2020/0393583 | A1 | | 12/2020 | Williamson et al. |

OTHER PUBLICATIONS

PCT Notification of Transmittal of the International Search Report and the Written Opinion of the International Searching Authority, or the Declaration for Application No. PCT/US2020/038166 dated Nov. 18, 2020.

PCT, Notification of Transmittal of the International Search Report and The Written Opinion of the International Searching Authority, or the Declaration for Application PCT/US2021/044454 dated Nov. 10, 2021.

Office Action mailed Jan. 15, 2025 for Canadian Patent Application No. 3, 188,717, 4 pages.

* cited by examiner

DIRECT FILL CHAMBER

CROSS REFERENCE TO RELATED APPLICATIONS

This application claims the benefit of U.S. provisional application No. 63/063,053 entitled "DOUBLE BAFFLE CHAMBER," which was filed on Aug. 7, 2020, and which is hereby incorporated by reference, in its entirety for all purposes.

BACKGROUND

This application relates to geophysical exploration and seismic data acquisition, including seismic source technologies. Applications include, but are not limited to, seismic sources systems for marine seismic surveys, seismic data acquisition, and geophysical image generation.

In marine seismic exploration, a sensor array is commonly towed behind a marine vessel. A series of hydrophones (or pressure sensors), motion sensors (or accelerometers), and/or depth sensors are deployed along one or more ropes or cables, and configured to sense seismic energy propagating through the water column. Alternatively, the sensors can be deployed along ocean-bottom cables, or in autonomous seismic sensor nodes distributed on the seabed, or suspended at depth below the surface or in a borehole for vertical seismic profile.

The seismic energy is typically produced by seismic sources configured to generate periodic bursts of seismic energy. The sources can be deployed by the same seismic vessel that tows streamers, or by designated source vessels. The seismic energy generated by the sources propagates down through the water column in the form of acoustic waves, which can penetrate the seafloor and reflect from subsurface structures.

The reflected seismic energy is detected at the seismic sensor locations, in the form of an upward-propagating seismic wavefield. The sensors produce seismic data by sampling the seismic wavefield, and the data are processed to generate seismic images of the underlying structures.

SUMMARY

In one exemplary implementation, a seismic source includes a reservoir configured to hold compressed gas, a first firing head coupled to the reservoir, the first firing head configured to generate seismic energy by releasing a first portion of the compressed gas from the reservoir to form a first gas bubble in a seismic medium, and a second firing head coupled to the reservoir, the second firing head configured to generate seismic energy by releasing a second portion of the compressed gas from the reservoir to form a second gas bubble in the seismic medium. The seismic source also includes at least one first fill line coupled directly to the reservoir.

In another exemplary implementation, a system includes a reservoir configured to hold compressed gas, the reservoir comprising a first port configured to connect to a direct fill line to receive the compressed gas for filling the reservoir, and a first firing head coupled to the reservoir, a second firing head coupled to the reservoir. Further, the first firing head comprises a second port configured to connect to an indirect fill line to receive the compressed gas for filling the reservoir.

In another exemplary implementation, a method includes filling a reservoir shared by first and second firing heads in a seismic source using a direct fill line directly connected to the reservoir, firing the first firing head to generate seismic energy by releasing a first portion of compressed air from the reservoir to form a first gas bubble in a seismic medium, and firing the second firing head to generate seismic energy by releasing a second portion of compressed air from the reservoir to form a second gas bubble in the seismic medium.

DETAILED DESCRIPTION

Figure 1:
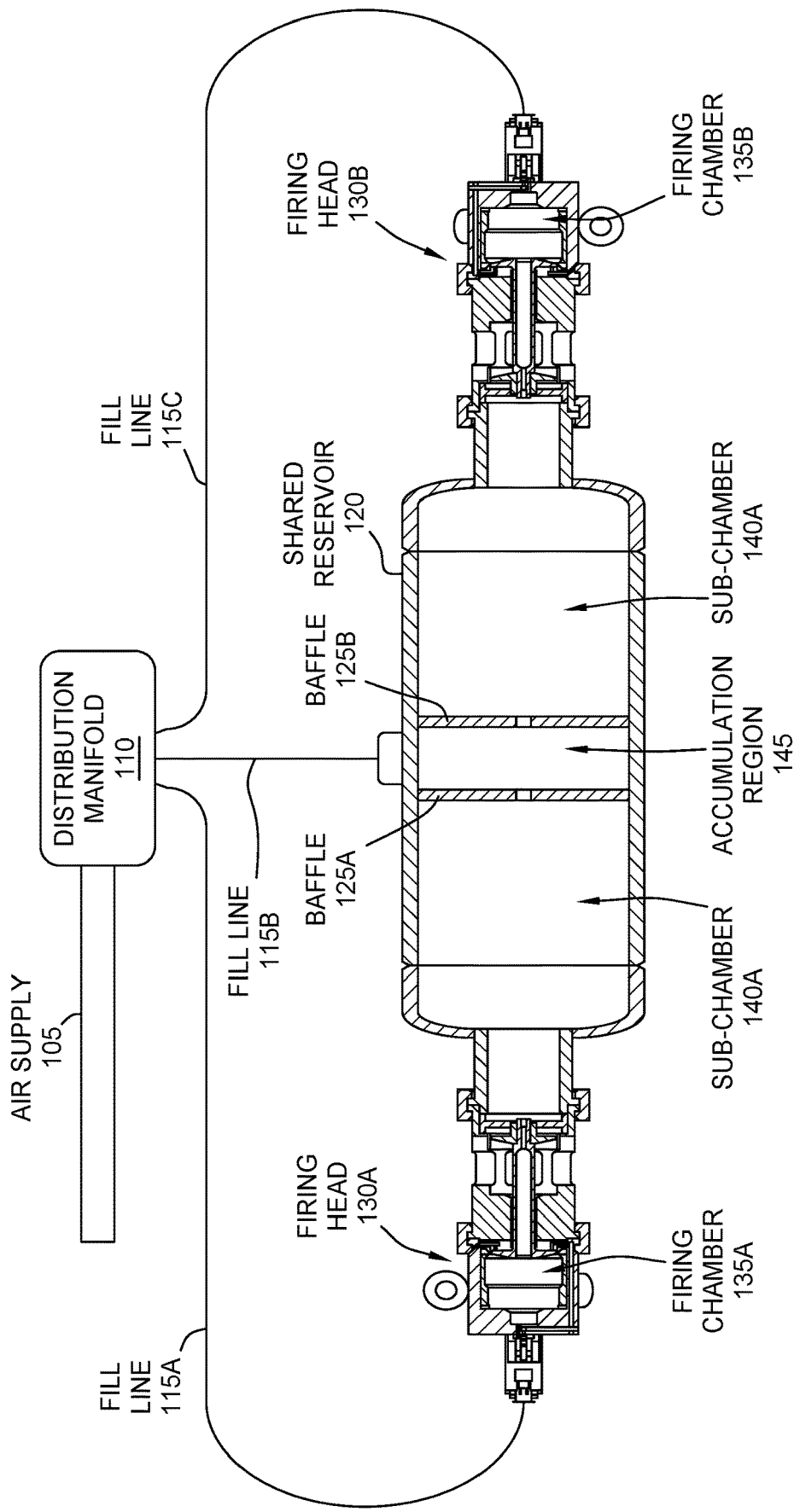
FIG. 1 illustrates a seismic source with a shared reservoir containing multiple baffles, according to one embodiment herein.

In this disclosure, reference is made to examples and embodiments of the disclosure. It should be understood that the claims are not limited to these specifically described examples, and any combination of the following features and elements is contemplated to implement and practice embodiments of the disclosure, as recited in the claims, and as described in terms of the embodiments disclosed herein.

Although the various features of the disclosure may provide certain advantages over the prior art, and over other possible solutions to the problems addressed herein, whether or not such advantages are achieved does not limit the disclosure to a given embodiment. The following aspects, features and advantages of the disclosure are merely illustrative, and are not to be construed as features or limitations of the claims, except where explicitly recited therein. References to "the disclosure" shall not be construed as a generalization of any of the subject matter that is disclosed, and do not limit the claims except where the relevant features are expressly stated.

The embodiments herein describe a seismic source that includes at least two firing heads connected to a shared reservoir that can have one, two, three, or more chambers of compressed gas. As used herein, compressed gas includes any compressed gas, whether a single gaseous element or a combination of gaseous elements. For purposes of illustration, embodiments are described herein with reference to compressed air, as one example of a compressed gas. When underwater, a controller can instruct the firing heads to fire at the same time or at different times to create air bubbles that generate seismic energy for identifying structures underneath a body of water. If the firing heads fire at the same time or substantially the same time (e.g., within a half a second of each other), the resulting air bubbles may coalesce to form a single bubble. In one embodiment, the firing heads are attached at opposite ends of the shared reservoir (although this is not a requirement).

Further, the shared reservoir can include multiple baffles that subdivide the reservoir into separate chambers (referred to herein as sub-chambers). In one embodiment, the seismic source includes at least two baffles that form three sub-chambers, two of which correspond to respective firing heads while the third sub-chamber forms an accumulation region for refilling the other two sub-chambers. One advantage of a baffle is that it prevents one firing head from using most of the compressed air in the shared reservoir if it fires before the other firing head. Stated differently, the baffles ensure the compressed air is better distributed between the two firing heads to generate air bubbles of generally the same size relative to shared reservoirs that do not have the baffle. One advantage of using multiple baffles is that it permits the use of one or more additional fill lines (e.g., pneumatic hoses) that can be used to directly refill the reservoir after the firing heads have been activated. This can greatly reduce the refill time, thereby increasing the frequency at which the heads can be fired relative to a shared reservoir that has no baffles and/or no direct fill lines.

FIG. 1 illustrates a seismic source with a shared reservoir 120 containing multiple baffles 125. As mentioned above, the shared reservoir 120 is filled with compressed gas which is then released by firing heads 130 to generate seismic energy. In this embodiment, the compressed gas for refilling the reservoir 120 is provided by an air supply 105, a distribution manifold 110, and fill lines 115A, 115B, and 115C. In one embodiment, the air supply 105 is attached to a source on a vessel that is towing the seismic source illustrated in FIG. 1. For example, the air supply 105 (e.g., a hose) may be coupled to one or more air compressors on the source vessel. The distribution manifold 110 receives the compressed gas from the air supply 105 and then distributes the gas to the three fill lines 115A, 115B, and 115C. In this embodiment, the fill line 115A is attached to the seismic source using a port at the firing head 130A, the fill line 115B is attached directly to port on the reservoir 120, and the fill line 115C is to port of the firing head 130B. In one embodiment, the distribution manifold 110 provides the same amount of compressed gas on the three fill lines 115A, 115B, and 115C, but in other embodiments, one or more of the fill lines 115A, 115B, and 115C may receive more compressed gas than the other fill line or lines 115A, 115B, and 115C.

As shown, the shared reservoir 120 includes two baffles 125A and 125B which divide the reservoir 120 into three sub-chambers: sub-chamber 140A, sub-chamber 140B, and an accumulation region 145. In this example, after the firing heads 130 have been fired/activated, the fill line 115B provides compressed gas directly into the accumulation region 145 while the fill lines 115A and 115C provide compressed gas into respective firing chambers 135A and 135B. That is, the fill line 115B bypasses the firing heads 130 to provide compressed gas directly into a port of the reservoir. Moreover, the firing chambers 135A and 135B are all in fluidic communication. That is, the compressed gas can flow between the firing chamber 135A, the sub-chamber 140A, the accumulation region 145, the sub-chamber 140B, and the firing chamber 135B. However, when refilling the reservoir, the pressures may be different in the chambers since the compressed gas is inserted into different places. For example, the gas pressure in the firing chambers 135, and the accumulation region 145 may be higher than the sub-chambers 140A, B when the reservoir 120 is being refilled. Thus, in this embodiment, the sub-chambers 140A, B rely on being fluidly connected to the firing chambers 135A, B and the accumulation region 145 to be filled with compressed gas. For example, the sub-chamber 140A may be refilled primarily from compressed gas provided by the firing chamber 135A and the accumulation region 145 while the sub-chamber 140B is filled by the firing chamber 135B and the accumulation region 145.

However, when gas is no longer being forced into the seismic source, the pressure among the firing chambers 135, sub-chambers 140, and the accumulation region 145 equalizes. As discussed in more detail below, the baffles 125 can include a pressure regulation feature such as an aperture or controlled valve so that the sub-chambers 140 and firing chambers 135 can be in pressure equilibrium. However, this pressure regulation feature can be designed so that if one firing head 130 fires before the other, that firing head does not use the compressed gas from the shared reservoir 120 intended for the other firing head. For example, if the firing head 130A activates before the head 130B, the firing head 130 ejects the compressed gas in the sub-chamber 140A without using much (or any) of the compressed gas in the sub-chamber 140B intended to be used by the firing head 130B.

The accumulation region 145 provides a volume (e.g., a sub-chamber) for reducing the time needed to fill the sub-chambers 140A, B relative to a seismic source that relies only on the fill lines 115A, C and the firing chambers 135A and 135B to refill the sub-chambers 140A, B. Specifically, the accumulation region 145 permits the fill line 115B to be directly attached to the shared reservoir 120. While fill lines can be directly attached to the sub-chambers 140A, B, there are several disadvantages of doing so. One, adding fill lines increases costs, so directly attaching a fill line to each sub-chamber 140 doubles the costs relative to adding a single fill line as shown. Further, these lines are fragile and thus having more lines increases the risk of a leak which may require the seismic survey to stop for repair. Also, directly filling the sub-chambers 140A, B can result in a premature firing of the firing heads 130. That is, the firing heads 130A, B may prematurely fire due to the rapid increase of pressure in the sub-chambers 140A, B from having a directly attached fill line.

To mitigate or eliminate these disadvantages, in FIG. 1 the fill line 115B is attached to the accumulation region 145 which is separated from the sub-chambers 140A, B by the baffles 125A, B. As mentioned above, the baffles 125A, B can include pressure regulation features that permit the compressed gas in the accumulation region 145 to flow into the sub-chambers 140A, B but this flow is regulated (or constricted) so as not to cause a premature firing of the heads 130A, B. Instead of each of the sub-chambers 140A, B being filled primarily from only one source (e.g., the respective firing chambers 135), both are also filled by the accumulation region 145 in a controlled manner that dramatically reduces fill time but also mitigates the risk of premature firing.

The volumes of the sub-chamber 140A, B may be equal, while the volume of the accumulation region 145 may be less. However, the actual volumes of the sub-chambers 140A, B and the accumulation region 145 may vary depending on the application—e.g., the desired size of the air bubbles or the desired frequency of firings. In one example, the volume of the sub-chambers 140A, B is greater than 1000 cubic inches, while the volume of the accumulation region 145 is less than 1000 cubic inches, and may be less than 500 cubic inches, but again this can vary. Further, the volumes of the firing chambers 135A, B may be less than 100 cubic inches.

In one embodiment, because of the pressure differences that may arise between the sub-chambers 140A, B and the accumulation region 145 when firing the heads 130 and during refilling, the baffles 125 may be reinforced. For example, the reservoir 120 may include gussets disposed at angles between the baffles 125 and the cylindrical side of the reservoir 120. Further, the accumulation region 145 can include stand offs that extend between the baffles 125 (arranged in the horizontal direction) to provide additional support to the baffles 125.

Figure 2:
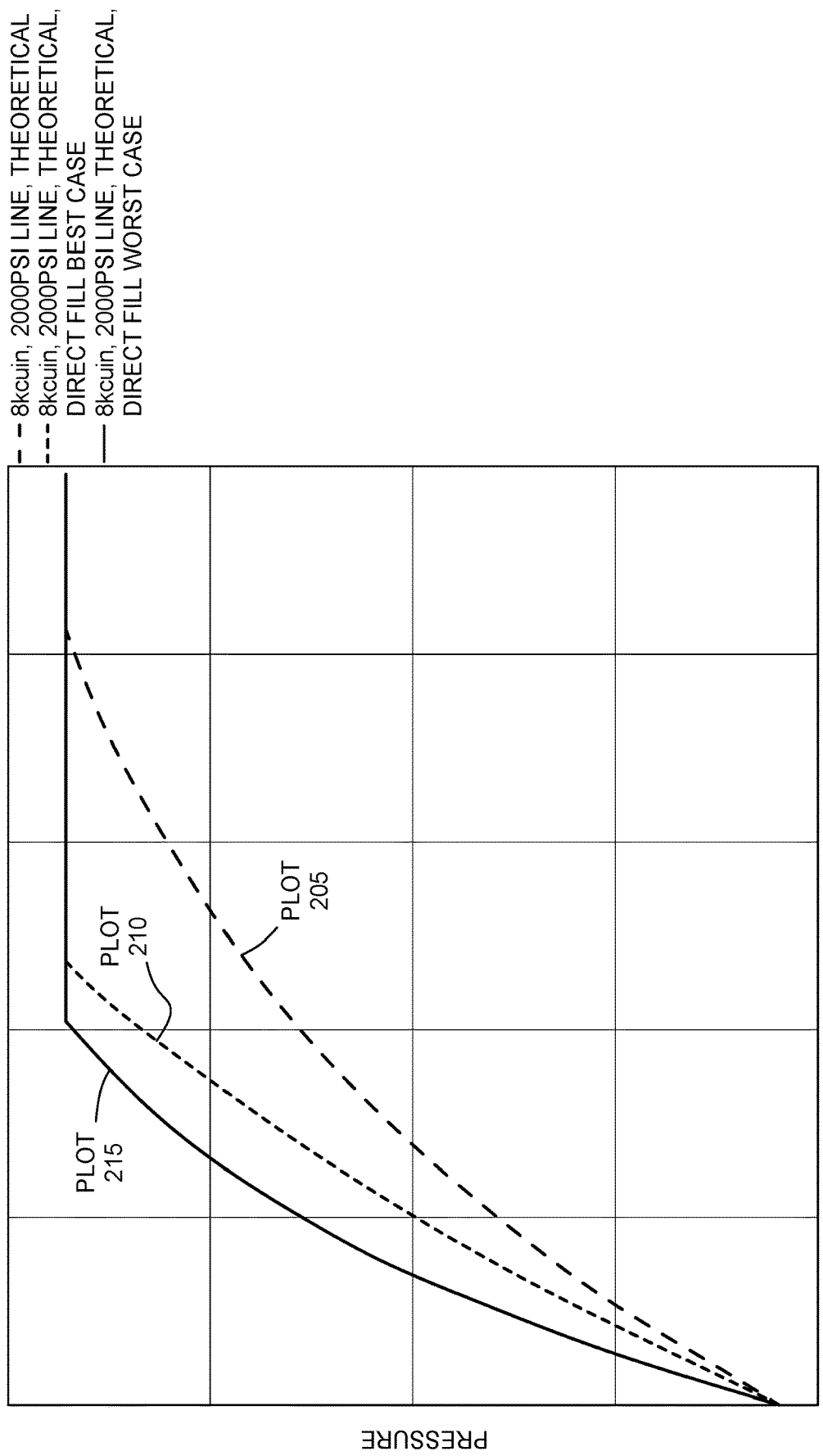
FIG. 2 is a chart that illustrates the advantages of a seismic source illustrated in FIG. 1, according to one embodiment herein.

FIG. 2 is a chart that illustrates the advantages of a seismic source illustrated in FIG. 1. The plots 210 and 215 illustrate refill times (X-axis) to fill the shared reservoir 120 in FIG. 1 to 2000 psi (Y-axis). Specifically, the plot 215 illustrates the theoretical best fill case while the plot 210 illustrates the theoretical worst fill case.

In contrast, the plot 205 illustrates the time required to refill a shared reservoir to 2000 psi that does not include the double-baffle forming the accumulation region 145. For example, the shared reservoir corresponding to the plot 205 may have the same volume as the shared reservoir 120 but may have only a single baffle (and no direct feed line 1158) or no baffle. As shown, it takes longer to fill the shared reservoir without the use of the accumulation region. Thus, even the worst case plot 210 of using the double baffle leads to a reduction in refill time while the best case plot 205 can result in an even greater reduction in refill time. Thus, because the seismic source in FIG. 1 can fire roughly twice as fast as a seismic source without the accumulation region and direct feed line, the vessel towing the seismic source can move roughly twice as fast, thereby dramatically reducing the survey time.

Figure 3:
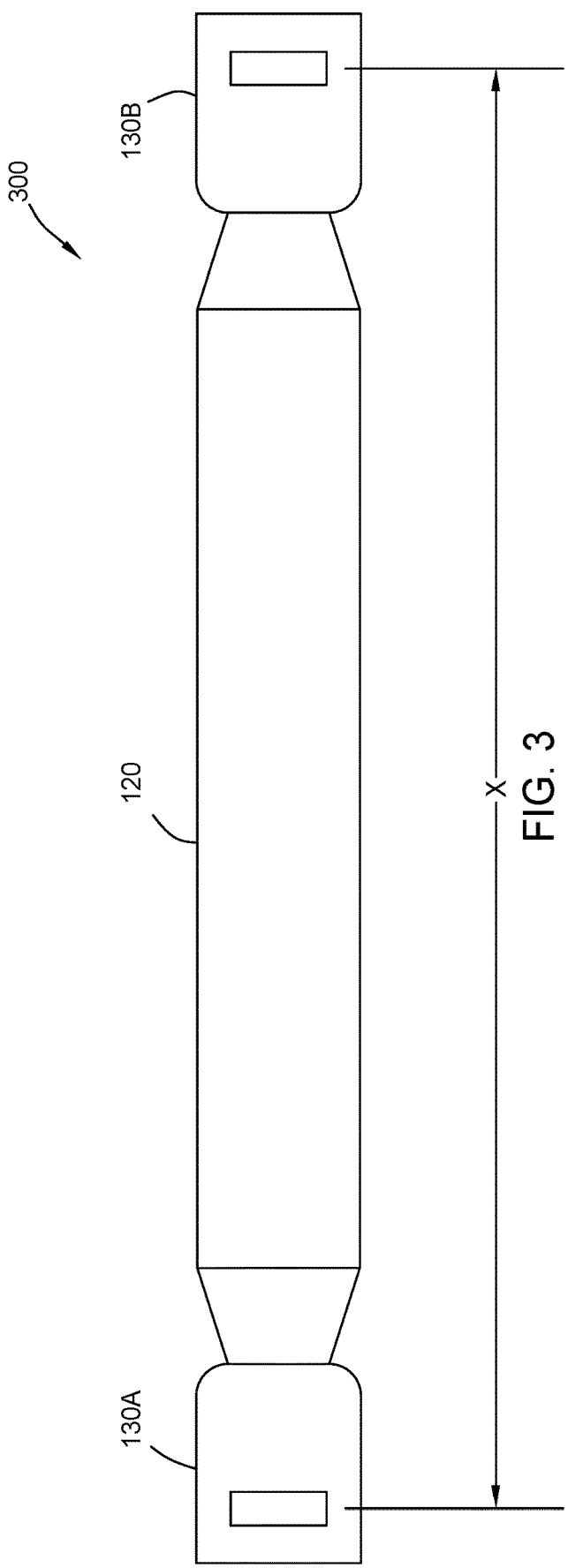
FIG. 3 includes a perspective view of a shared-reservoir seismic source, according to one embodiment herein.

FIG. 3 includes a perspective view of a shared-reservoir seismic source 300 in accordance with embodiments of the disclosure that can be one embodiment of the source illustrated in FIG. 1. As shown in FIG. 3, the shared-reservoir seismic source 300 includes a first firing head (e.g., air gun) 130A and a second firing head 130B on opposite ends of a shared reservoir 120. Each of the firing heads 130A, 130B may include a respective housing with one or more outlet ports, a respective solenoid valve assembly, and/or other types of triggering mechanisms. The one or more outlet ports may include one or more annular ports, in some examples. The shared reservoir 120 may serve as a shared reservoir chamber (e.g., fire chamber) for both of the first firing head 130A and the second firing head 130B. The firing heads 130A, 130B are in pressure communication with the shared reservoir 120 which provides compressed gas to the firing heads 130A and 130B which then eject the compressed gas from an outlet port during a firing sequence to generate respective air bubbles. The shared reservoir 120 can be provided as a gland type, a solid design, and/or with a radiused, threaded shaft shuttle and shuttle bearing.

Each of the first firing head 130A and the second firing head 130B may have respective firing characteristics, such as a single outlet port, more than one outlet port, a fixed air bubble volume, a configurable air bubble volume, a fixed firing pressure, a configurable firing pressure, a minimum recovery time between firings, or any combination thereof. In some examples, the respective firing characteristics of the first firing head 130A and the second firing head 130B may all be equivalent. In some examples, the respective firing characteristics of the firing head 130A and the firing head 130B may all be different. In some examples, the respective firing characteristics of the first firing head 130A and the second firing head 130B may include combinations of equivalent and different respective firing characteristics.

The firing head 130A and the firing head 130B may include individual control components (and/or the shared chamber seismic source 300 includes control circuitry) to allow the firing head 130A and the firing head 130B to be independently fired. That is, the firing head 130A and the firing head 130B may be fired simultaneously, sequentially or staggered (with a controlled delay between each firing), asynchronously, or any combination thereof. The control components and/or control circuitry may be configured to determine firing timing based on signals received via wired or wireless communication circuitry (e.g., from a towing or other vessel, control components of the other firing head, from another shared chamber seismic source array, etc., or combinations thereof), based on internal timing circuitry and programmed timing configurations or parameters, or any combination thereof.

In one embodiment, upon initial release, the bubble generated by each firing head 130A, 130B has its own independent characteristics (frequencies, size, etc.), which then evolves as the bubbles interact or merge with each other and reach a steady state. By controlling the timing, frequency, and size of the bubbles, the seismic source 300 can create unique signatures by using different size different chamber volumes, introducing delays between activation of different heads, etc.

The control components may include electronic activation components, mechanical activation components, or any combination thereof. For example, the firing of the firing head 130A and the firing head 130B may be intentionally staggered, such as to account for delays in transmission or response times of different types of heads or to achieve a certain desired interaction between bubbles formed when the firing head 130A and the firing head 130B are fired (e.g., having the bubble coalesce).

The cylindrical or tubular frame or housing of the shared reservoir 120 may serve as a support system for the firing head 130A and the firing head 130B. That is, the firing head 130A and the firing head 130B may be attached, affixed, mounted, etc., to the housing of the shared reservoir 120. Each of the firing heads 130A, 130B may couple to a respective port of the shared reservoir 120 to receive compressed gas. The cylindrical or tubular frame or housing of the shared reservoir 120 may include an inlet port to receive metered by air supply diameter, valves, or any other flow restriction mechanism or to receive unmetered compressed air from a compressed air source for refilling between firing sequences. In one embodiment, the cylindrical or tubular frame or housing of the shared reservoir 120 has insulation mechanisms to prevent heat transfer between the reservoir 120 and the water in which the source is submerged. In one embodiment, the cylindrical or tubular frame or housing of the shared reservoir 120 can be equipped with wired or autonomous sensors either externally or internally mounted to measure an environmental condition, e.g., pressure, temperature, humidity, depth, salinity, or any other sensing devices.

The shared reservoir 120 may have a length of X meters to provide a separation distance between the firing head 130A and the firing head 130B. In some examples, the respective firing characteristics and relative compressed gas discharge timing of each of the firing head 130A and the firing head 130B, and the volume, the separation distance, and/or pressure of the shared reservoir 120 may be selected to achieve a particular effect between air bubbles fired from each of the firing heads 130A, 130B. That is, the seismic energy (e.g., including a frequency spectrum) generated by the shared-reservoir seismic source array 300 may be based on the separation distance between the firing heads 130A and 130B, the relative compressed air discharge timing, and compressed gas discharge volume provided from each of the firing heads 130A and 130B.

Thus, in some examples, the separation distance may be selected to achieve a desired effect between air bubbles fired from the firing heads 130A, 130B. For example, the separation distance may be selected to result in the respective air bubbles coalescing when fired from the firing head 130A and the firing head 130B. In another example, the separation distance may be selected to result in the respective air bubbles interacting but not coalescing when fired from the firing head 130A and the firing head 130B. In yet another example, the separation distance may be selected to result in the respective air bubbles not interacting when fired from the firing head 130A and the firing head 130B.

The length of X meters is at least 1 meter, in some examples. The length of X meters is 2 or more meters, in some examples. The length of X meters is approximately 2 meters, in some examples. The length of X meters is 5 or less meters in some examples.

As mentioned above, the shared reservoir 120 may include one or more baffles (e.g., or one or more other physical chamber dividers) that are configured to divide the reservoir into two or more separate sub-chambers. The two or more separate sub-chambers may be equal in volume, in some examples. In other examples, the two or more separate sub-chambers may be different in volume. In yet other examples where the shared reservoir 120 is divided into three or more separate sub-chambers, the three or more separate sub-chambers may include a combination of equal and different volumes.

In some examples, the one or more baffles (e.g., or one or more other physical chamber dividers) may include ports that may be selectively opened or closed based on a desired mode of operation, such as a first mode where the shared reservoir 120 is operated as a single shared chamber, a second mode where the shared reservoir 120 is split into two separate shared sub-chambers, or other modes of operation where the shared reservoir 120 is split into three or more separate shared sub-chambers.

When the shared reservoir 120 is divided into two or more different sub-chambers, each individual sub-chamber may be independently filled with compressed gas to a respective pressure. The respective pressure stored in each of the two or more different sub-chambers may be different, equivalent, or combinations thereof.

Figure 4:
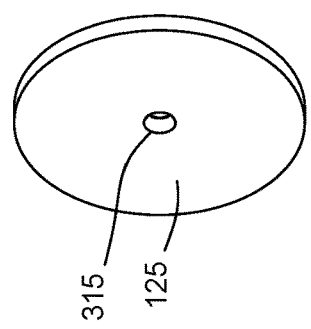
FIG. 4 illustrates a baffle in a shared-reservoir seismic source, according to one embodiment herein.

FIG. 4 illustrates a baffle 125 in a shared-reservoir seismic source 300 in accordance with embodiments of the disclosure. The baffle 125 can be made of any material suitable for separating the reservoir 120 into two sub-chambers. For example, the baffle may be metallic and welded into place in the reservoir 120.

As mentioned above, if one of the firing heads 130A, 130B fires before the other, most of the compressed gas may be directed out of the first head that fires, leaving less (or little) compressed gas for the other head. The multiple baffles 125 can be used to equally distribute the compressed gas between the firing heads 130A, 130B as well provide the accumulation region 145 in FIG. 1.

In FIG. 4, the baffle 125 includes a port 315 (e.g., a pressure regulation feature) that forms an aperture that fluidly connects two sub-chambers of the reservoir 120. The port 315 ensures that the pressure in the two sub-chambers remains the same even when the compressed gas received at multiple inlet ports differ. In one embodiment, the diameter of the aperture may range from 1/32 of an inch to three inches.

In another embodiment, the port 315 includes a valve for selectively coupling the sub-chambers in the reservoir 120. In one embodiment, the valve is a passive check valve that is not actively controlled. Alternatively, the valve may be actively controlled by a controller. For example, when refilling the reservoir 120, the controller for the seismic source 300 may open the valve to fluidly connect two sub-chambers, thereby equalizing their pressure. However, before (or when) firing the firing heads 130A, 130B, the controller can close the valve so that the sub-chambers are no longer fluidly connected. Thus, if one firing head 130A, 130B fires before the other, it cannot use air from another sub-chamber. Alternatively, the valve in the baffle 125 can be used to select different modes of operation—e.g., a first mode where the sub-chambers are in fluid connection and have the same pressure and a second mode of operation where the valve remains closed so the sub-chambers can have different pressures.

Figure 5:
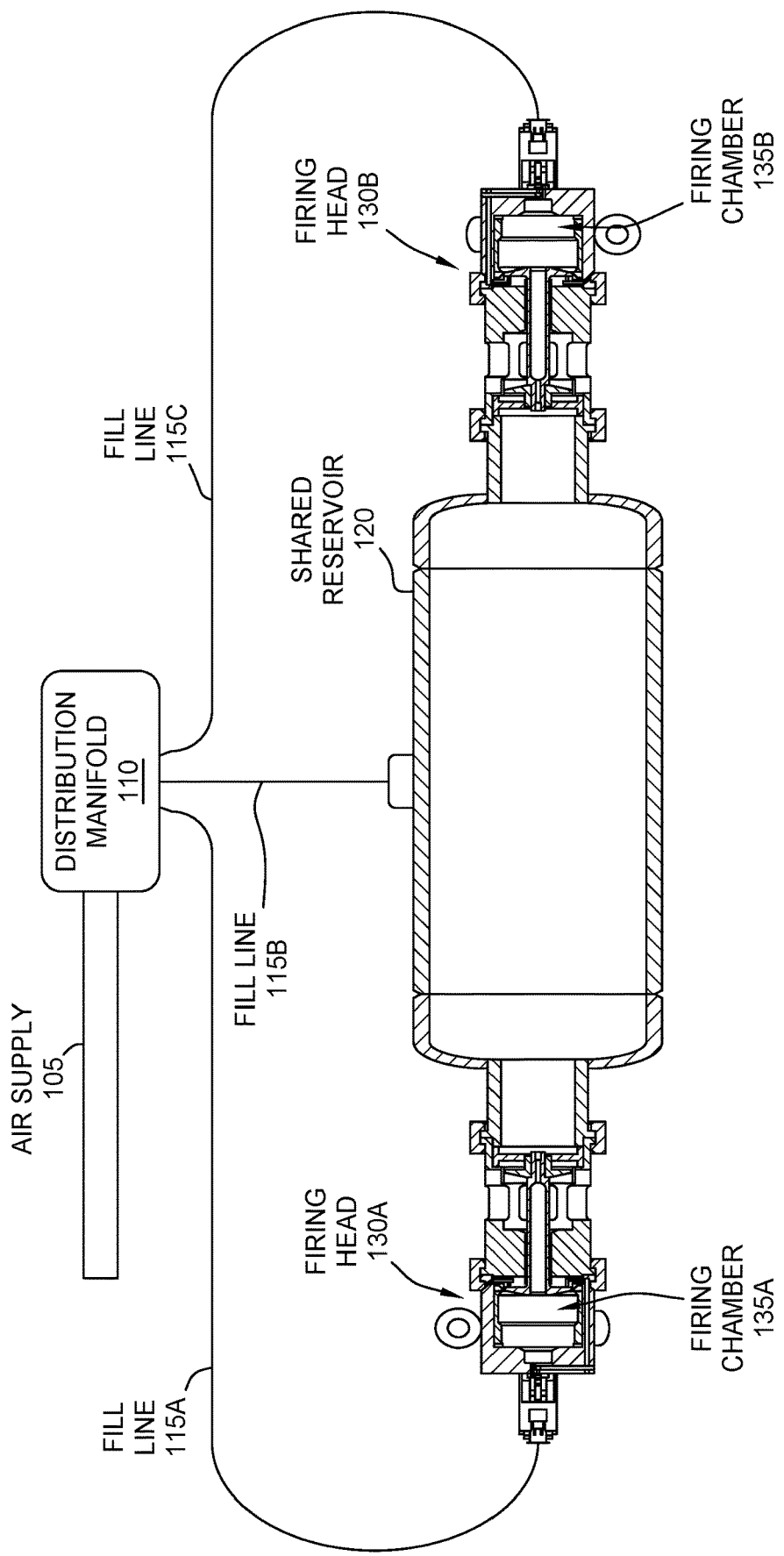
FIG. 5 illustrates a seismic source with a shared reservoir with a direct fill line, according to one embodiment herein.

FIG. 5 illustrates a seismic source with a shared reservoir 120 with a direct fill line 1158, according to one embodiment herein. The seismic source in FIG. 5 is the same as the seismic source illustrated in FIG. 1 except that the shared reservoir 120 does not include the baffles 125. That is, in this embodiment, the shared reservoir 120 is one continuous reservoir which supplies gas for firing the heads 130. As such, FIG. 5 illustrates that dividing the reservoir 120 into sub-chambers using baffles is optional.

Like in FIG. 1, the reservoir 120 is filled using indirect fill lines (or indirect pneumatic hoses)—e.g., the fill lines 115A and 115C which connect to the firing heads 130—and a direct fill line 1158 (or direct pneumatic hoses) which directly couples to the reservoir 120. As used herein, an indirect fill line is any fill line that connects to a component in the seismic source where the gas provided by the indirect fill line passes through the component (or multiple components) before reaching the reservoir 120. A direct fill line, in contrast, is connected to the reservoir 120 (e.g., a side or outer surface of the reservoir) so it can provide gas directly into the reservoir 120.

While FIG. 5 illustrates one direct fill line 1158, in other embodiments the seismic source may have multiple direct fill lines extending from the distribution manifold 110 and the reservoir 120. Moreover, in one embodiment, the indirect fill lines 115A and 115C can be omitted. In that example, the shared reservoir 120 is filled using only the direct fill line 1158, or multiple direct fill lines directly connecting to the reservoir 120. For example, the seismic source may include direct fill lines connected to opposite ends of the reservoir 120, near where the firing heads 130 are fluidly connected to the reservoir 120.

Figure 6:
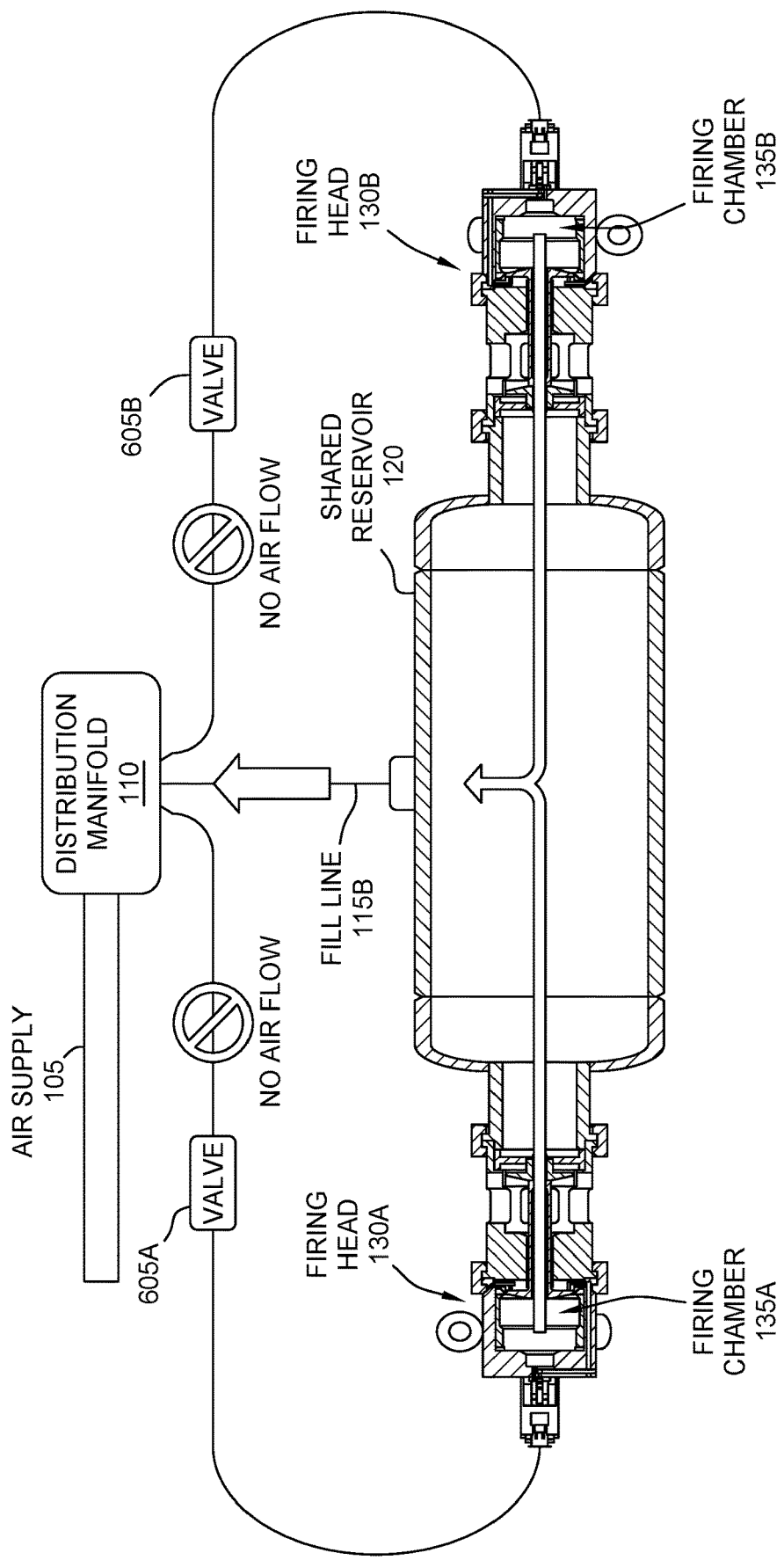
FIG. 6 illustrates a seismic source with non-return valves for direct fill line depressurization, according to one embodiment herein.

FIG. 6 illustrates a seismic source with non-return valves 605A and 605B for direct fill line depressurization, according to one embodiment herein. The seismic source in FIG. 6 has many of the same components as those discussed in FIGS. 1 and 5, which are not described in detail here. While FIG. 6 illustrates that the reservoir does not have baffles (like the embodiment shown in FIG. 5), in other embodiments the reservoir does have at least one baffle, and may have multiple baffles arranged as shown in FIG. 1.

In this example, the seismic source includes non-return valves 605 disposed along the fill lines 115A and 115C. After a seismic survey is complete, the operator may want to depressurize the reservoir 120. Instead of having a separate depressurization valve, the reservoir 120 can be depressurized using a fill line. However, because of the large volume difference between the reservoir 120 and the firing chambers 135, using the indirect fill lines 115A and 115C to depressurize the reservoir 120 can cause the firing heads 130 to auto-fire (i.e., fire unintentionally).

The non-return valves 605 prevent an auto-fire by preventing the air from flowing from the reservoir 120 through the firing chambers 135. That is, the non-return valves 605 prevent all (or substantially all) the air from flowing from the firing heads 130 to the distribution manifold 110 via the fill lines 115A and 115C. Because the direct fill line 115B does not have a non-return valve 605, all, or substantially all, of the pressurized gas in the reservoir 120 flows through it to reach the distribution manifold 110.

The non-return valves 605 can be controlled or uncontrolled valves. For example, an uncontrolled non-return valve 605 closes when depressurization begins and air begins to flow "backwards" through the fill lines 115A and 115C. This backward airflow causes the uncontrolled non-return valves 605 to automatically close to prevent air from flowing through the fill lines 115A and 115C. However, when beginning to re-pressurize the reservoir 120, a "forward" airflow through the fill lines 115A and 115C automatically opens the non-return valves 605 so that these lines can be used to pressurize the reservoir as discussed above. Alternatively, the non-return valves 605 can be controlled valves which are activated by an operator on the vessel towing the seismic source. The operator can close the valves 605 when depressurizing the reservoir 120 and then open the valves 605 when resuming normal operation.

Figure 7:
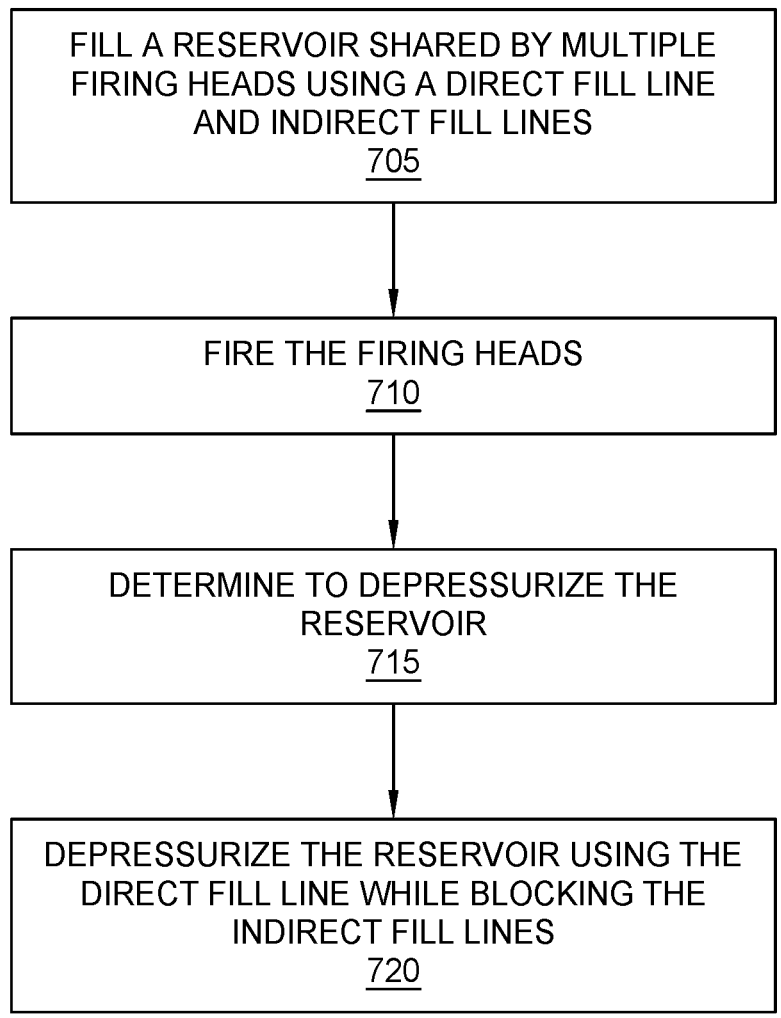
FIG. 7 is a flowchart for firing and depressurizing a seismic source, according to one embodiment.

FIG. 7 is a flowchart of a method 700 for depressurizing a seismic source, according to one embodiment. At block 705, an air source (e.g., pump) on a vessel fills a reservoir shared by multiple firing heads in a seismic source using one or more direct fill lines and one or more indirect fill lines. As discussed above, the air source may provide air to a distribution manifold that then distributes the pressurized air to the direct and indirect fill lines in order to pressurize the reservoir.

The air source may be controlled by a seismic survey application (e.g., a software application) or a human operator. The seismic survey application or operator may determine when the air source provides air to the reservoir, or may instruct the air source to provide a constant amount of air to the reservoir.

At block 710, the seismic survey application or operator fires the firing heads. That is, the seismic survey application or operator sends an electrical signal to the firing heads which causes them to release a certain amount of the air in the shared reservoir. The seismic survey application or operator can use any of the firing schemes described in FIG. 3 above to control the firing heads to create energy for performing a seismic survey.

At block 715, the seismic survey application or operator determines to depressurize the reservoir. For example, the vessel may have completed the seismic survey, or there may be a malfunction that requires maintenance on the seismic source.

At block 720, the seismic survey application or operator depressurizes the reservoir using the direct fill line while blocking the indirect fill lines. In one embodiment, the indirect fill lines include non-return valves that prevent a backward flow of air from the pressurized reservoir to the distribution manifold or the air source. Using the example in FIG. 6, the indirect fill lines may connect to the firing heads where a sudden depressurization can cause the firing heads to unintentional fire. Nonetheless, the method 700 can be used in any seismic source where it is desired to block the indirect fill lines from being used to depressurize the reservoir.

Instead, the direct fill line(s) can be used to depressurize the reservoir. Moreover, it may be safe to use an indirect fill line to depressurize the reservoir so long as using that fill line does not cause substantial air flow through the firing heads. For example, the seismic source may contain an indirect fill line connected to some other component besides the firing head. This indirect fill line may be used along with a direct fill line to depressurize the reservoir. However, any indirect fill line connected to a firing head may be blocked during depressurization.

Figure 8A:
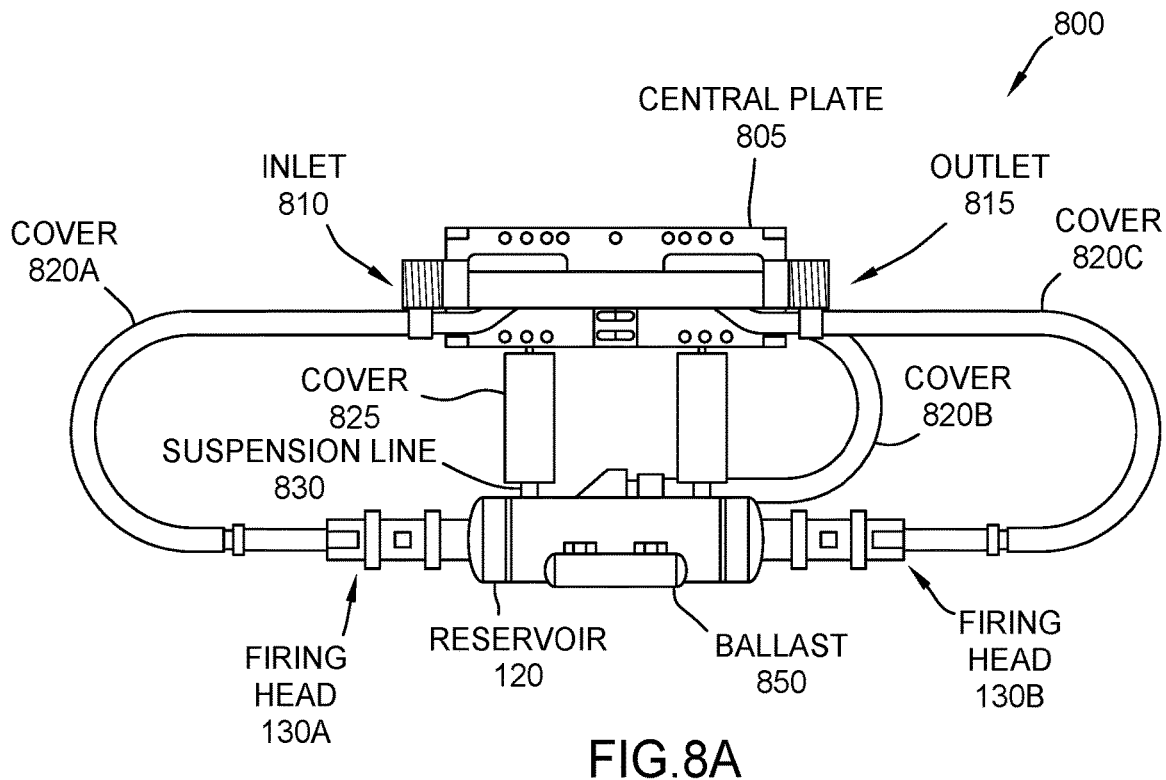
FIGS. 8A-8C illustrate a control plate on which a seismic source is suspended, according to one embodiment.
Figure 8B:
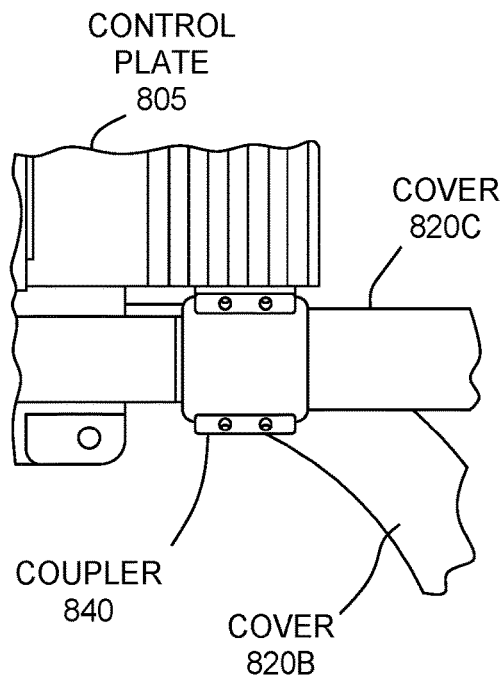
Figure 8C:
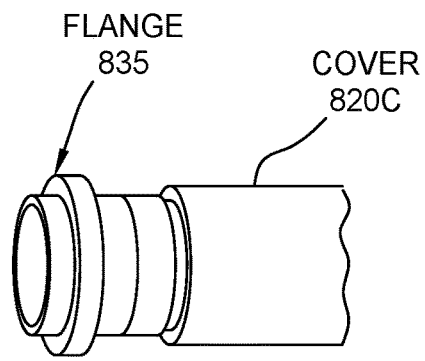

FIGS. 8A-8C illustrates a control plate 805 on which the seismic source is suspended, according to one embodiment. FIG. 8A illustrates a general view of a seismic source system 800 while FIGS. 8B and 8C illustrate close-ups of different portions of that system 800.

As shown in FIG. 8A, the reservoir 120 is suspended from the control plate 805 (e.g., made from a metallic material) using suspension lines 830 (two suspension lines in this example) which can be chains, cables, ropes, and the like. As will be discussed in later figures, the control plate 805 can be in turn suspended on a float so the seismic source system 800 can maintain a certain depth in the water.

In this example, the suspension lines 830 are encased (or extend through) a rigid or semi-rigid protective cover 825. When firing the firing heads 130A and 130B, the seismic source can jump up in a direction towards the control plate 805. The covers 825 mitigate the likelihood the reservoir 120 or firing heads 130A and 130B strikes the plate 805 when the source is fired. The covers 825 can be made of any material (e.g., a polymer, plastic, rubber, metal, etc.) that provides sufficient rigidity to resist the seismic source from rapidly moving up and striking the control plate 805.

Moreover, the seismic source system 800 includes covers 820 that encase the pneumatic hoses and electrical wires that extend from the control plate 805 to the seismic source (i.e., the firing heads 130 and the reservoir 120). In one embodiment, the covers 820 are formed from rigid or semi rigid materials and protect the pneumatic and electrical lines. For example, the material of the protective covers 820 may be more rigid than the pneumatic hose and electrical lines, and thus, minimizes the deformation of these lines when being towed. Further, the covers 820 can provide support to the connection between the control plate 805 and the pneumatic hose and electrical lines and mitigate rubbing between these lines and the control plate 805 and the seismic source. In this example, the indirect fill lines connected to the firing heads 130 are protected by the covers 820A and 820C while the direct fill line connected to the reservoir 120 is protected by the cover 820B.

In this example, the seismic source system 800 includes a ballast 850 (e.g., a weight) attached to the reservoir 120. As mentioned above, the reservoir 120 may jump up when being fired, and could strike the control plate 805. The ballast 850 along with the covers 825 can help prevent the seismic source from striking the control plate 805. While one ballast 850 is shown, additional ballasts can be attached to the seismic source. For example, another ballast may be attached to the opposite side of the reservoir 120.

Although not shown, the control plate 805 can be coupled to an umbilical line attached to a tow vessel. The umbilical line can connect to an inlet 810 of the control plate 805 to provide air to the distribution manifold (not shown) mounted on the control plate 805 and provide electrical power and control signals. Moreover, the umbilical line can provide a towing force that pulls the control plate 805 and the seismic source in the water. In one example, the control plate 805 and the seismic source are towed to the left by the tow vessel such that the firing heads 130 are aligned in the towing direction. Further, another umbilical line can be connected to an outlet 815 of the control plate which in turn connects to another control plate and seismic source (not shown) disposed to the right. That is, multiple seismic sources can be towed in a line, or in series. The umbilical cord connecting the two control plates can transfer pressurized air and electrical power and control signals from the control plate 805 to the downstream control plates/seismic sources. In this manner, the tow vessel can tow, and fire, multiple seismic sources using one primary umbilical cord.

FIG. 8B illustrates a close up view of the connections between the covers 820B and 820C and the control plate 805. The covers 820B and 820C are attached to the plate 805 using respective couplers 840. In one embodiment, the covers 820B and 820C slide over outlets of the control plate 805 and the couplers 840 are used to clamp the covers 820B and 820C to those outlets. For example, the couplers 840 can be clam shell couplers. A similar type of connection system can be used to attach the cover 820A to the control plate 805.

FIG. 8C illustrates a close up view of an end of the cover 820C that connects to the firing head 130B. As shown, the cover 820C includes a flange 835 that connects with the firing head 130B. For example, the firing head 130 may include a receptacle that mates with the flange 835.

Figure 9A:
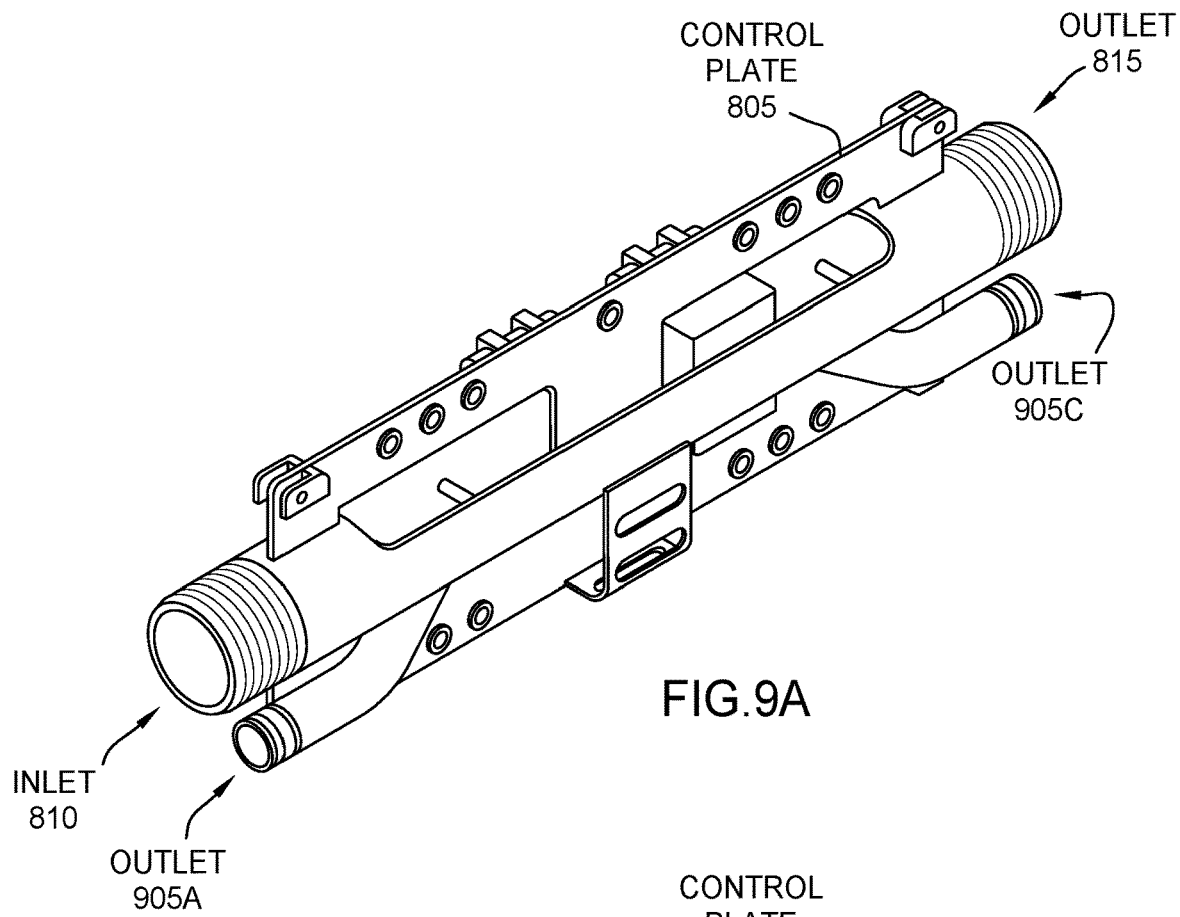
FIGS. 9A and 9B illustrate front and back views of a control plate, according to one embodiment.
Figure 9B:
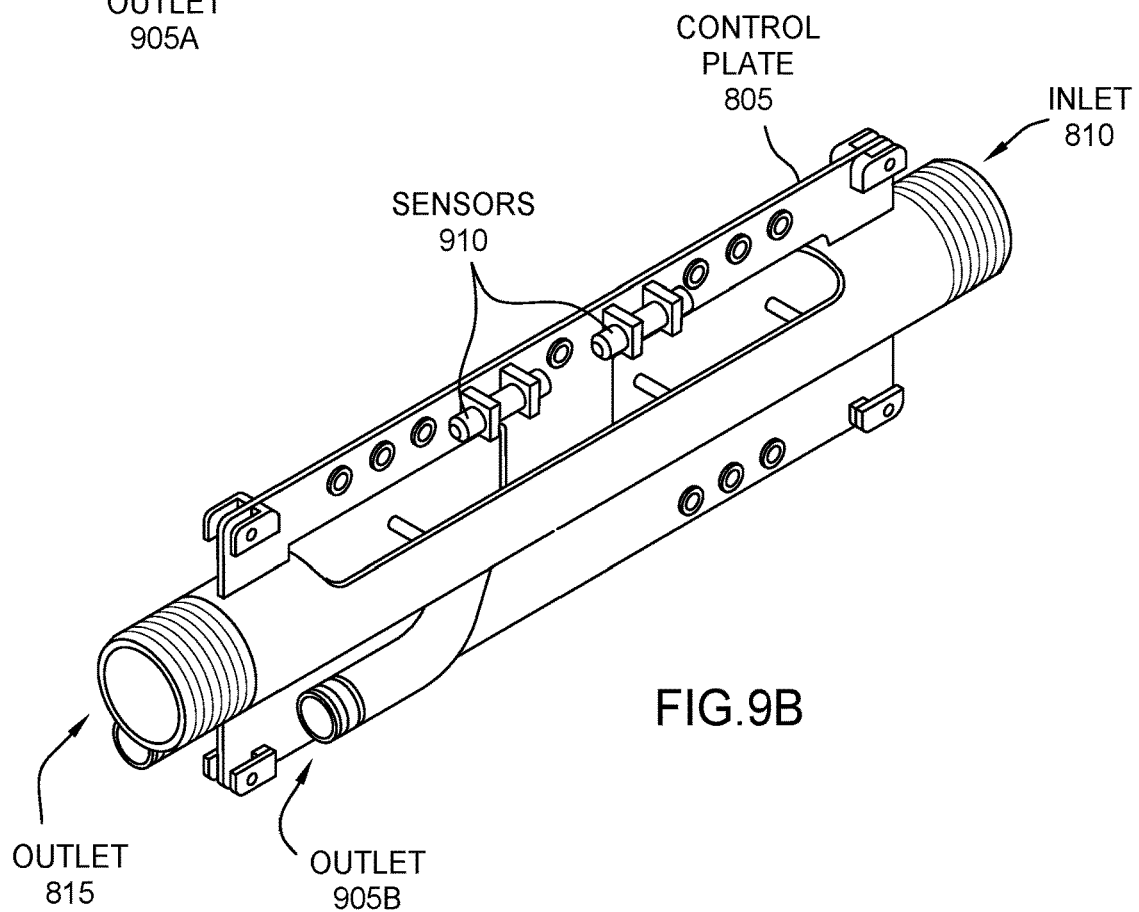

FIGS. 9A and 9B illustrates front and back views of a control plate, according to one embodiment. The front view of the control plate 805 illustrated in FIG. 9A has the inlet 810 and outlet 815 as shown in FIG. 8A which can connect to umbilical lines extending to the tow vessel or to another control plate for a different seismic source. FIG. 9A also illustrates outlet 905A which can couple to the cover 820A in FIG. 8A and outlet 905C which can couple to the cover 820C in FIG. 8A. The pneumatic hoses and electrical wires for the firing heads 130A and 130B can extend through the outlets 905A and 905C.

The back view of the control plate 805 illustrated in FIG. 9B includes an outlet 905B which can couple to the cover 820B in FIG. 8A. The pneumatic hose used as the direct fill line to fill the reservoir can extend through the outlet 905B. Moreover, FIG. 9B illustrates sensors 910 mounted on the control plate 805. These sensors 910 can be hydrophones (e.g., near-field hydrophones), water temperature sensors, location sensors, and the like. While FIG. 9B illustrates the control plate 805 having two sensors 910, any number of sensor can be mounted onto the plate 805.

Figure 10:
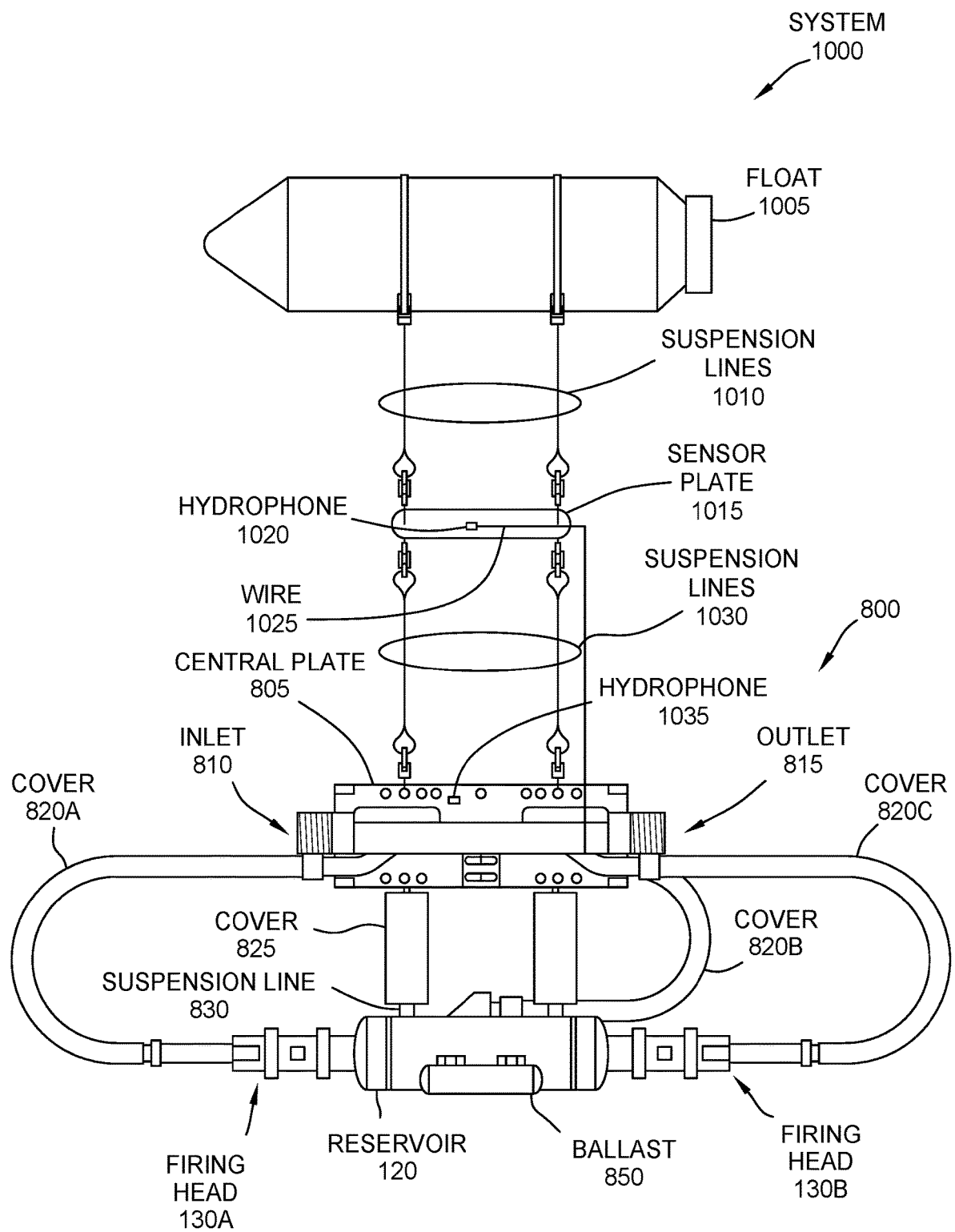
FIG. 10 illustrates disposing a hydrophone between a control plate and a float, according to one embodiment.

FIG. 10 illustrates disposing a hydrophone 1020 between a control plate 805 and a float 1005, according to one embodiment. The seismic source system 1000 in FIG. 10 includes the float 1005 that provides buoyancy to a sensor plate 1015, the control plate 805, and the seismic source. The hydrophone 1020 is disposed on the sensor plate 1015 which is in turn suspended between the float 1005 and the control plate 805. In one embodiment, the hydrophone 1020 is a vertical near-field hydrophone. While the system 1000 can include another hydrophone 1035 mounted on the control plate 805 (which can be another near-field hydrophone), it has been found that having multiple near-field hydrophones to detect the seismic energy emitted by the seismic source disposed at different depths is advantageous. That is, using multiple near-field hydrophones that are arranged at different water depths relative to the seismic source can provide more accurate data for checking the quality of the source signature of the seismic source. As such, the sensor plate 1015 is added to the system 1000 between the float 1005 and the control plate 805.

The system 1000 include suspension lines 1010 that connect the float 1005 to the sensor plate 1015 and suspension lines 1030 that connect the sensor plate 1015 to the control plate 805. These suspension lines 1010, 1030 can be cables, chains, ropes, and the like. Moreover, while the system 1000 illustrates two suspension lines 1010 and two suspension lines 1030, one suspension line could be used to connect the float to the sensor plate 1015 and one suspension line to connect the sensor plate 1015 to the control plate 805; however, that might permit the sensor plate 1015 to rotate or spin when the system 1000 is being towed, which might be undesirable.

Figure 11:
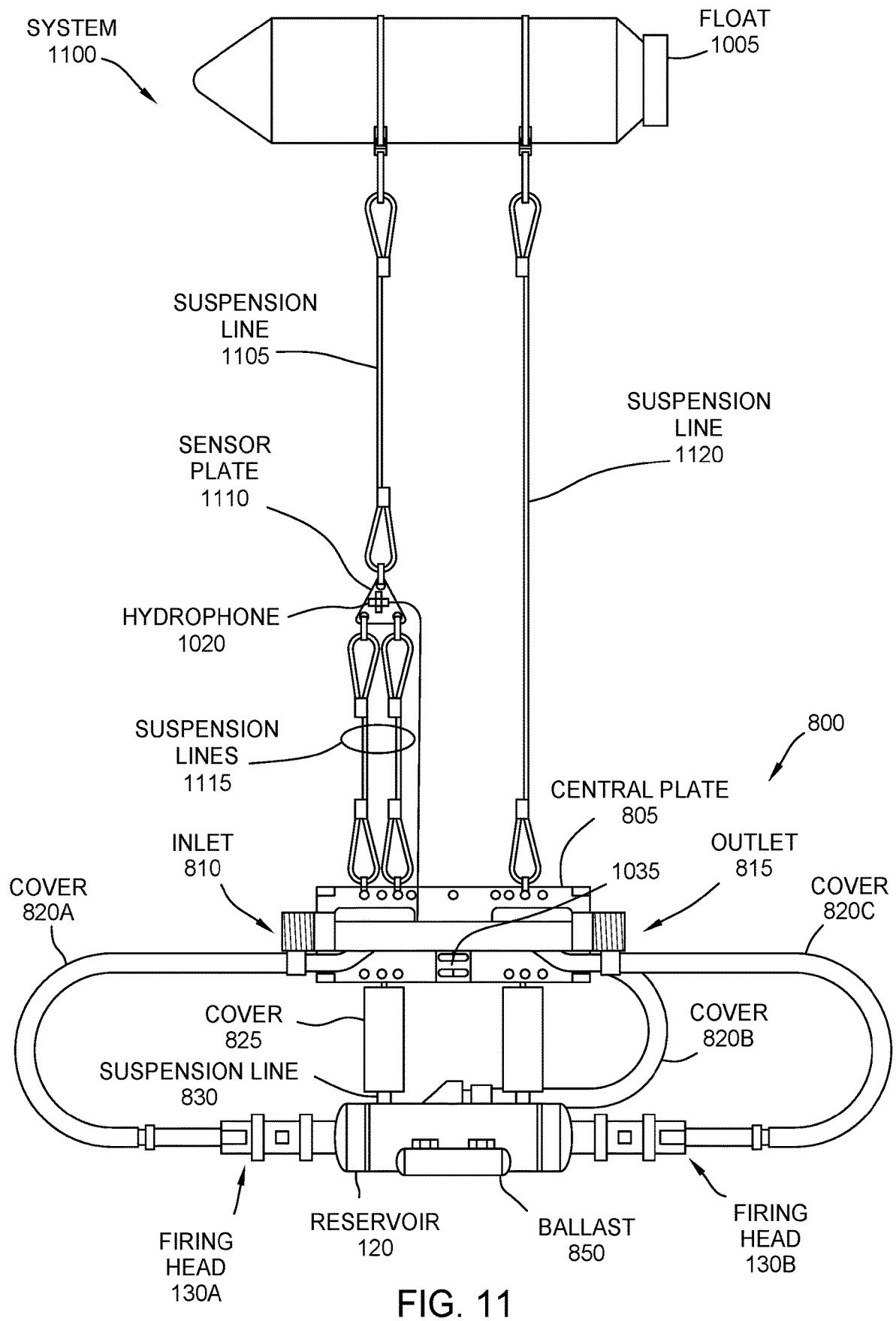
FIG. 11 illustrates disposing a hydrophone between a control plate and a float, according to one embodiment.

FIG. 11 illustrates disposing a hydrophone 1020 between the control plate 805 and the float 1005, according to one embodiment. The seismic source system 1100 is similar to the system 1000 in FIG. 10 except that it illustrates a different technique for suspending a sensor plate 1110 containing the hydrophone 1020 between the float 1005 and the control plate 805. Here, a suspension line 1105 connects the float 1005 to the sensor plate 1110 so that the hydrophone 1020 is at a different water depth than the hydrophone 1035 on the control plate 805. Two suspension lines 1115 connect the sensor plate 1110 to the control plate 805. While one suspension line can be used, using two (or more) suspension lines 1115 to connect the sensor plate 1110 to the control plate 805 may prevent the sensor plate 1110 from spinning or rotating when being towed. Further, in another embodiment, instead of using two suspension lines 1115 to connect the sensor plate 1110 to the control plate 805, two or more suspension lines 1105 can be used to connect the sensor plate 1110 to the float 1005, while only one suspension line 1115 is used to connect the sensor plate 1110 to the control plate 805. This too may prevent the sensor plate 1110 from spinning or rotating.

In view of the foregoing, the scope of the present disclosure is determined by the claims that follow.

We claim:

1. A seismic source comprising:
   a reservoir configured to hold compressed gas;
   a first firing head coupled to the reservoir, the first firing head configured to generate seismic energy by releasing a first portion of the compressed gas from the reservoir to form a first gas bubble in a seismic medium; and
   a second firing head coupled to the reservoir, the second firing head configured to generate seismic energy by releasing a second portion of the compressed gas from the reservoir to form a second gas bubble in the seismic medium, wherein each of the first firing head and the second firing head comprises individual control components configured to allow the first firing head and the second firing head to be independently fired; and
   at least one first fill line coupled directly to the reservoir.

2. The seismic source of claim 1, wherein the reservoir comprises at least one baffle separating the reservoir into at least two sub-chambers, wherein the first fill line introduces gas directly into one of the at least two sub-chambers.

3. The seismic source of claim 1, further comprising:
a second fill line coupled to the first firing head to introduce gas into a first end of the reservoir; and
a third fill line coupled to the second firing head to introduce gas into a second end of the reservoir.

4. The seismic source of claim 3, further comprising:
non-return valves disposed on the second and third fill lines that prevent gas from flowing from the reservoir to an air source.

5. The seismic source of claim 3, further comprising:
a control plate configured to couple to an umbilical line to receive compressed gas from an air source on a tow vessel, the control plate comprising a distribution manifold for receiving the compressed gas from the umbilical line; and
suspension lines connecting the control plate to the reservoir, wherein the first, second, and third fill lines are connected to the distribution manifold.

6. The seismic source of claim 5, further comprising:
protective covers encasing the first, second, and third fill lines, the protective covers connected at first ends to the control plate and at second ends to the reservoir and the first and second firing heads.

7. The seismic source of claim 5, further comprising:
a float; and
a sensor plate comprising a first hydrophone, the sensor plate is connected by a first suspension line to the float and a second suspension line to the control plate such that, when being towed, the sensor plate is at a different depth than the control plate.

8. The seismic source of claim 7, further comprising:
a second hydrophone disposed on the control plate, wherein the first and second hydrophones are configured as near-field hydrophones to detect seismic energy generated by the seismic source.

9. The seismic source of claim 1, wherein the reservoir comprises at least two baffles dividing the reservoir into a first sub-chamber containing the first portion of the compressed gas, a second sub-chamber containing the second portion of the compressed gas, and an accumulation region.

10. The seismic source of claim 9, wherein the first fill line introduces gas directly into the accumulation region.

11. The seismic source of claim 1, wherein the first firing head and the second firing head include a receptacle that mates with a flange of a cover.

12. A seismic source comprising:
a reservoir configured to hold compressed gas;
a first firing head coupled to the reservoir, the first firing head configured to generate seismic energy by releasing a first portion of the compressed gas from the reservoir to form a first gas bubble in a seismic medium;
a second firing head coupled to the reservoir, the second firing head configured to generate seismic energy by releasing a second portion of the compressed gas from the reservoir to form a second gas bubble in the seismic medium, wherein each of the first firing head and the second firing head comprises individual control components configured to allow the first firing head and the second firing head to be independently fired and wherein the first firing head and the second firing head include a receptacle that mates with a flange of a cover; and
at least one first fill line coupled directly to the reservoir.

13. The seismic source of claim 1, further comprising:
a ballast connected to the reservoir.

\* \* \* \* \*